Figure 1:
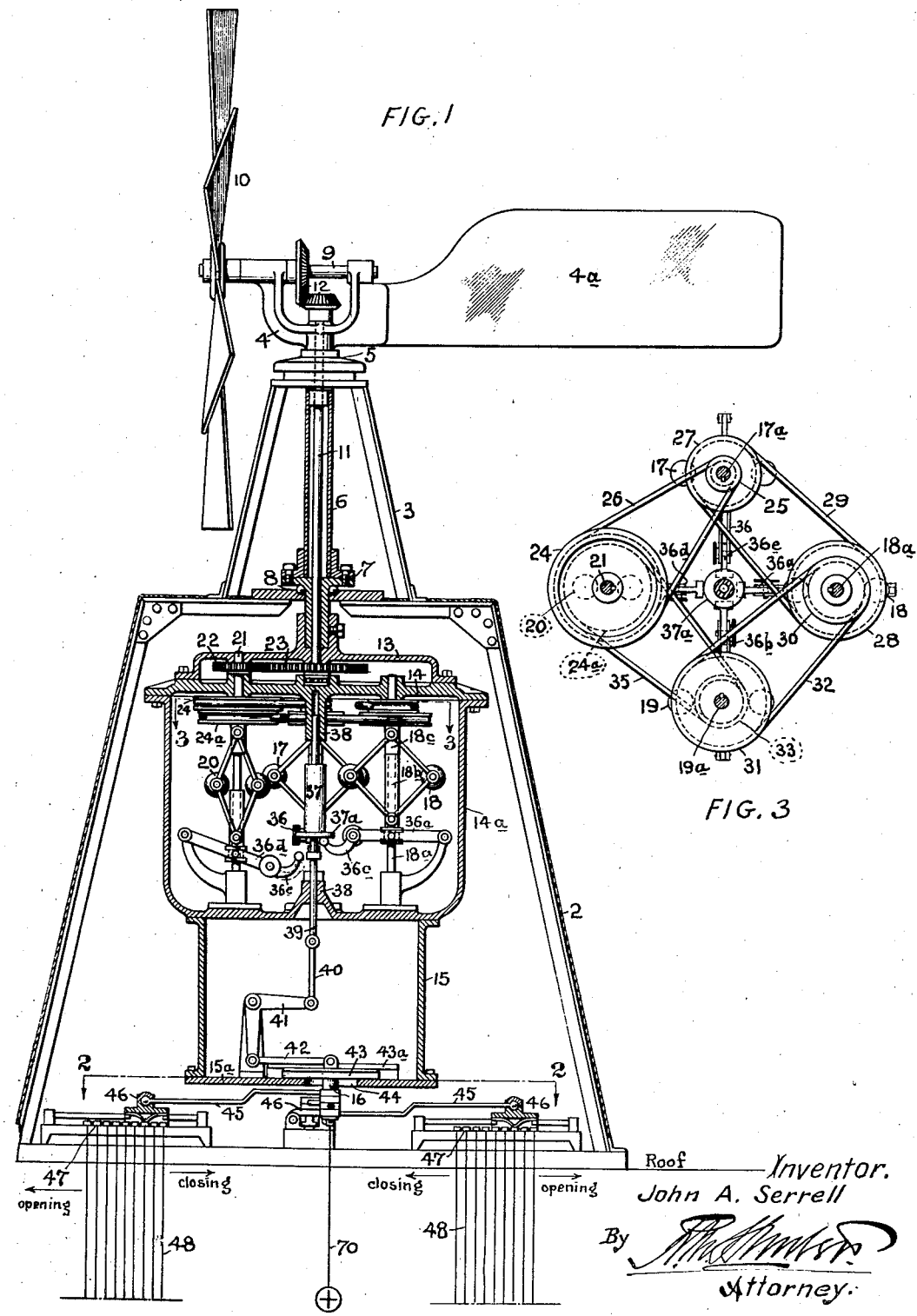

Nov. 10, 1936.   J. A. SERRELL   2,060,251
WIND CONTROLLED HEATING SYSTEM
Filed July 31, 1929   3 Sheets-Sheet 2

Inventor.
John A. Serrell
By
Attorney.

Nov. 10, 1936.                 J. A. SERRELL                 2,060,251
                         WIND CONTROLLED HEATING SYSTEM
                             Filed July 31, 1929          3 Sheets-Sheet 3
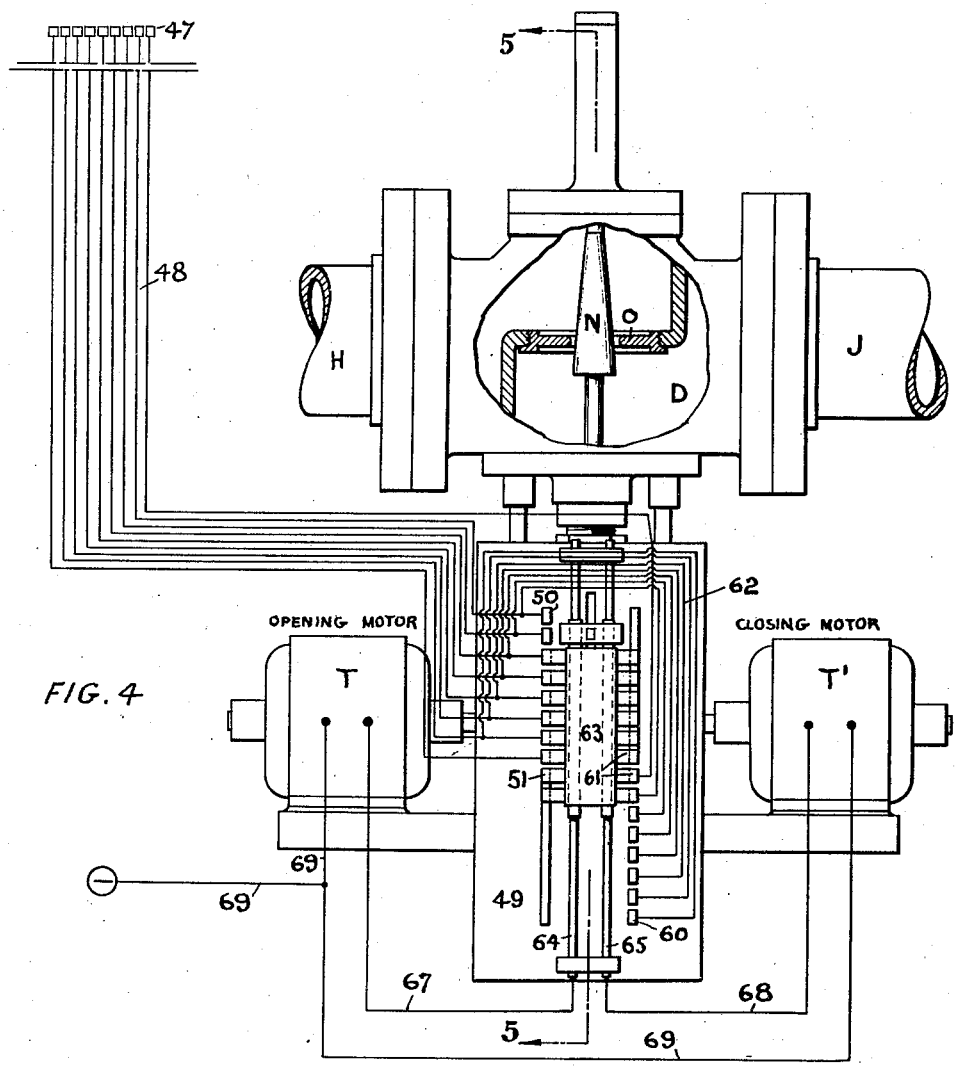
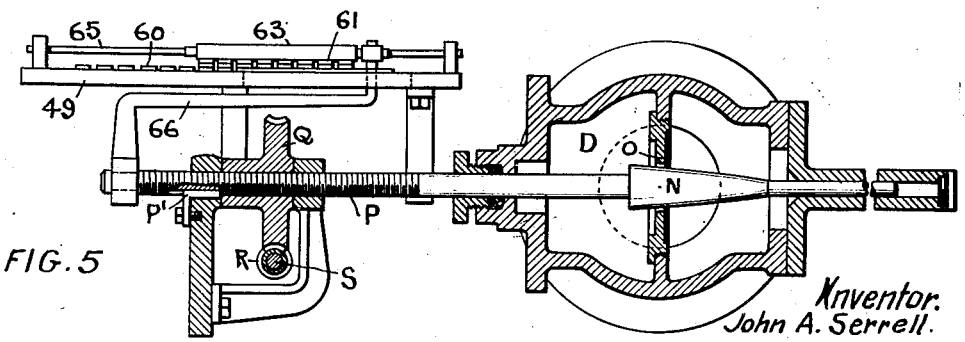
Inventor.
John A. Serrell.
By
Attorney.

UNITED STATES PATENT OFFICE 2,060,251

WIND CONTROLLED HEATING SYSTEM

John A. Serrell, Passagrille, Fla., assignor to Webster Tallmadge & Company Inc., East Orange, N. J., a corporation of New York Application July 31, 1929, Serial No. 382,546

26 Claims. (Cl. 236—91)

In buildings more or less exposed, the force and direction of the wind will cause the heat supplied to the windward side of the buildings to be neutralized by such wind, the loss being due largely to convection and in-leakage through windows, walls, etc. To maintain substantially uniform inside temperature, the larger portion of heat must be supplied to the radiation on that side of the building. Also, as the inward air leakage may be considerable, the heat is driven to the opposite side of the building and an excessive heating on the leeward side thereof will occur. When this happens, frequently windows are opened on that side with outflow and additional waste of heated internal air; and this opening of windows accentuates the in-leakage of air on the windward side with further objectionable cooling.

My invention has for an object the provision of suitable heating apparatus capable of regulation so that the interior temperature of the building may be maintained constant or substantially constant for varying outside conditions due to the wall exposures for the different points of the compass and to the cooling variations due to the conditions above mentioned; and the present application is more especially directed to automatic means for compensating for or controlling the heat supply to different portions of the building in accordance with velocity and directions of the wind conditions and changes thereof occurring outside of the walls of the building.

In a preferred embodiment of my invention, the building may have four main exposures, the walls of which are directed to the north, the south, the east, and the west, and with the corners of the building approximating northeast, northwest, southeast and southwest, the cooler winds being those which would reach the building from the north, northeast and northwest, whereas the milder winds will approach the building from the south, southeast and southwest. In a building of this character, I provide a system of heat supply through piping and radiators for each of the north, south, east and west zones, the heat supplied thereto being preferably under control of independent branch valves. Moreover, the heat thus supplied to the different zones is automatically controlled by a wind motor arranged upon the roof or other convenient location, the same being so constructed and interconnected with the valves that the zoning valves will be automatically operated under and in accordance with the direction of the wind and velocity thereof, whereby the windward side of the building may be given an increased heat supply preferably with a reduced supply to the leeward side.

It will be understood, however, that where a predetermined desired temperature is maintained within the building, the zoning control may be directed merely to increasing the supply of heat in those portions of the building which are upon the windward side.

With the above and other objects in view, the nature of which will be more fully understood from the description hereinafter, the invention consists in the novel improvements in a heating system, as hereinafter more fully described and defined in the claims.

Figure 2:
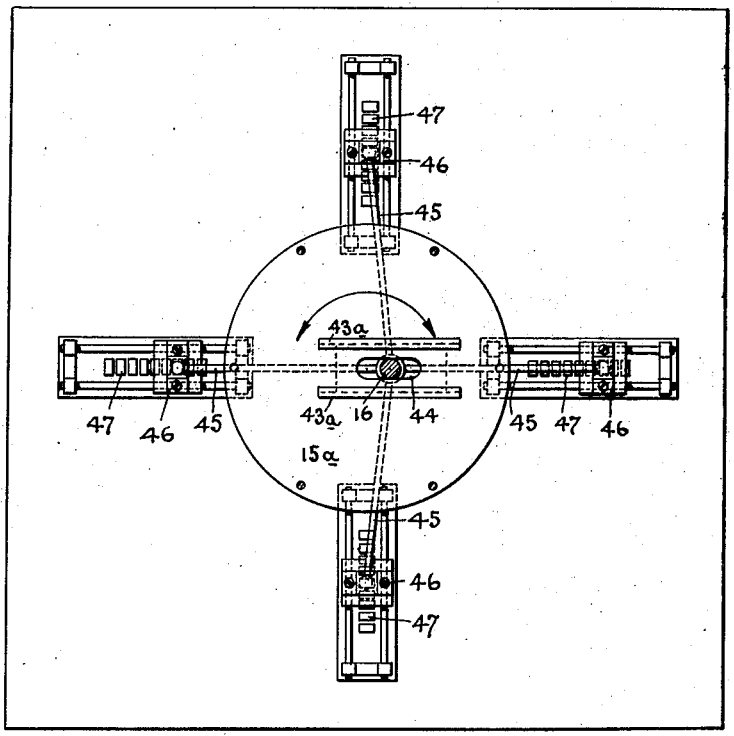
Figure 6:
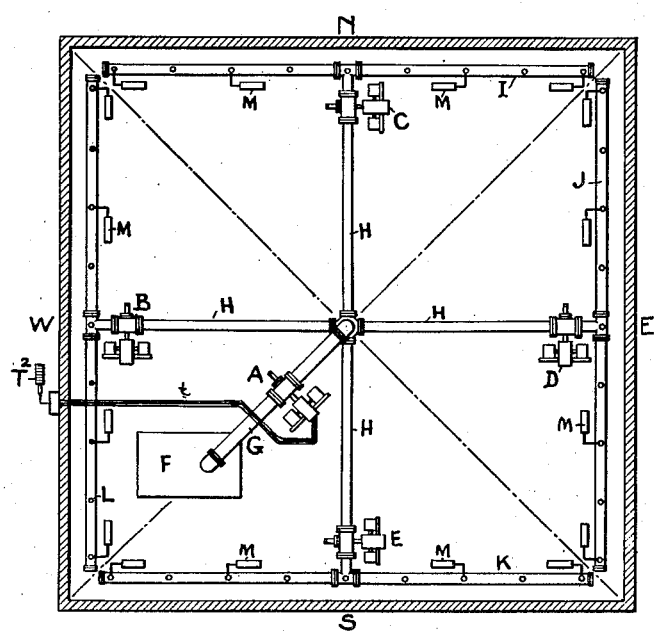

Referring to the drawings: Fig. 1 is a vertical section of a wind motor adapted to be placed upon the roof or other exposed position and adapted to control the valves of the heating system; Fig. 2 is a sectional plan view taken on line 2—2 of Fig. 1; Fig. 3 is a horizontal section on line 3—3 of Fig. 1, showing the driving means which interconnects the centrifugal governor devices; Fig. 4 is a plan view of one of the zoning valves and its operative means adapted to be controlled by the wind motor; Fig. 5 is a vertical section on line 5—5 of Fig. 4; and Fig. 6 is a horizontal section through a building showing one convenient arrangement of steam heating means and zoning valves adapted to be controlled by the wind motor.

Referring to the wind motor structure of Figs. 1, 2 and 3, I provide a suitable frame-work comprised in the lower part 2 arranged upon the roof and properly protected from the elements. This box-like structure is surmounted with an upper frame-work 3. Journaled in the bearing 5 at the upper end of the frame-work 3 and also in the bearing 8 on the top of the frame 2 is a vertical tubular shaft 6 extended into a bracket 4 to which is secured the vane 4a which swings under the influence of the wind. At the upper part of the bracket 4 is journaled a horizontal shaft 9, the same carrying at its forward end a propeller 10 of any suitable character such, for example, as is common with wind mills.

The tubular shaft 6 is extended downward at its lower end in a bearing member journaled in the bearing 8, the object of which will be pointed out hereinafter. Extending vertically upward is a shaft 11 journaled in bearings in the upper and lower portions of the tubular shaft 6, and so that the shafts 6 and 11 are concentric. The upper end of shaft 11 is provided with a bevel gear meshing with a similar gear on the horizontal wind propeller shaft 9, as indicated at 12. It will now be understood that the shaft 11 is rapidly rotated by the propeller 10, whereas the vane 4a follows the horizontal shifting of the wind and thereby adjusts the tubular shaft 6, performing the dual function of maintaining the propeller at all times facing the direction from which the wind is blowing and at the same time insuring that the shaft 11 shall be rapidly rotated. As explained hereinafter, the adjustment of the tubular shaft 6 under the control of the vane 4a, determines the selection of the part of the building or buildings which are to be automatically regulated under zoning control, whereas the speed of shaft 11 under the driving influence of the propeller 10 determines the extent of operation and the pressure or quantity of the steam or other heating fluid to be supplied.

The lower end of the tubular shaft 6 is provided with a downward extension which constitutes a part of the bearing 8 and, at the same time, provides a lower bearing for the shaft 11. Secured to this extension 7 is a flange head 13 so that the same rotates with the tubular shaft. Bolted to the under part of the head 13 is a bearing plate 14 and also secured to the said bearing plate 14 is a boxlike casing 14a which extends downward and encloses a series of centrifugal governors. The box-like casing 14a is further extended downward into a cylindrical casing 15 having a bottom plate 15a formed with an elongated slot 44.

The centrifugal governors are indicated at 17, 18, 19 and 20, and are so driven that they reach their maximum speed successively in the order named and each performs a lifting effort upon the central weighted rod 7 in such manner that the first quarter of the lift is performed by the governor 17, the next quarter of the lift is performed by the governor 18, the third quarter of the lift by the governor 19, and the final lift by the governor 20. These successive lifts are accomplished by levers 36a, 36b, 36c and 36d, of the respective governors 17, 18, 19 and 20, said levers having adjustable toe pieces 36e which successively press upward upon the flange 37a of the weighted rod 37.

The lifting movements of the several governors are limited so that when the weighted rod 37 is lifted the first quarter by governor 17, no further lifting effect is performed by this governor. Similarly, when the second quarter of the lift is performed by governor 18, no further upward lift is performed by that governor, and so on. The limit of these movements may be secured by employing a sleeve 18b lifted by the fly balls of the governor and coming to rest upon the collar 18c (as applied to governor 18). Under this construction, the fly ball governors may each be identical and operate in a similar manner, except that the lifting movements of the weighted rod 37 come into movement successively, said times of action being assured by the proper adjustments of the toes 36e of the levers. While I have shown a simple form of fly ball governor, these governors may be made in any suitable manner where centrifugal action is employed.

The central weighted rod 37 is guided at the top and bottom of the casing 14a by guide apertures 38. The lower end 39 of the weighted guide rod 37 extends into the tubular casing 15 and is jointed by a link 40 to a horizonal arm of a bell crank 41. The vertical arm of the bell crank is connected by a link 42 with an adjustable crank pin 16 extending through the slot 44 in the bottom plate 15a of the cylinder 15. This crank pin 16 is secured to a slide 43 so as to have radial movement in guides 43a on the bottom plate 15a. From the above description, it will be seen that by raising or lowering the weighted rod 37, the position of the crank pin 16 will be varied in a radial direction from the axis of rotation of the tubular shaft 6 and the depending portions carried with and rotated thereby, under the adjustment of the vane 4a according to the direction of the wind; and the extent of the adjustment of the crank pin 16 will depend upon the speed of the propeller 10 and the centrifugal governors actuated thereby.

The centrifugal governors 17, 18, 19 and 20 may be interconnected in the following manner: To the bottom of the shaft 11 is secured a spur gear 23 which meshes with a pinion 22, the latter connected with a vertical shaft 21 of the governor 20, this being the least responsive of the governors and consequently the final one to coact with the central weighted rod 37.

Referring to the plan view Fig. 3, it will be seen that the spindle 21 of governor 20 is provided with belt wheels 24 and 24a, the latter of which is belted at 35 to a small belt wheel 33 on the spindle 19a of the governor 19, (being the first of the governors to respond to speed of the propeller). The spindle 19a of the governor 19 is provided with a belt wheel 31 which is likewise belted at 32 with a smaller belt wheel 30 secured to the spindle 18a of the governor 18. Similarly, the spindle 18a of governor 18 is provided with a belt wheel 28 which is belted at 29 to a belt wheel 27 of smaller diameter on the shaft 17a of governor 17. Finally, to equalize the torque on the complete belt drive, the larger belt wheel 24 on spindle 21 of governor 20 is belted at 26 to belt wheel 33 of small diameter on spindle 17a of governor 17. In this manner, taking the speed of governor 20 as unity, governor 19 is driven at twice its speed, governor 18 is driven at three times its speed, and governor 17 is driven at four times its speed.

As before stated, the governor 20 rotates at the slowest speed and, therefore, comes into action only after the governor 19 has completed the extent of its lift, and as this governor 20 is directly driven by the shaft 11 and gears 22 and 23, it will not be necessary that it should be driven by a belt connection, but for equalizing the torque of the belt transmission between all of the several spindles of the governors, I have shown a belt driven connection 26 between the larger belt wheel 24 of driving spindle 21 and the smaller belt wheel 25, as above stated.

It will be understood that the above described manner of connecting the different governors may be modified as desired, as it is manifest that gearing may be employed instead of belts. In fact, it is immaterial in what manner the motive power to the governors is provided, so long as they operate successively in adding their lifting increments to the central weighted rod or device which adjusts the crank pin 16 radially outward and permits it to be adjusted radially inward under decreasing action of the wind.

Arranged about the crank pin 16 and at right angles to the respective outer walls of the building which may correspond to the four points of the compass, are circuit controlling switches each comprising a plurality of fixed contacts 47 respectively connecting with circuits 48 which lead to and cause the operation of the heat controlling zone valves (Figs. 4 and 5), and a sliding contact 46 reciprocated over the fixed contacts 47 and connected to the crank pin 16 by a connecting rod 45. The particular details of this circuit controlling switch mechanism is immaterial and may be modified from the construction shown, so long as the same function is performed.

70 indicates one of the electrical terminals and it supplies current to the sliding contacts 47 in any convenient manner, such, for example, as through the crank pin and connecting rods 45. From the construction shown, as illustrated in Figs. 1 and 2, it will be understood that when one of the contacts is moved, for example, in a northerly direction, to supply more heat through the corresponding zoning valve, the opposite contact device will operate in a manner to reduce the supply of heat by the zoning valve corresponding to the southern exposure, this under the supposition that the wind is blowing from a northerly direction. The same co-action and control of the zoning valves will take place with wind from an easterly or westerly direction. If, however, the wind strikes the building from a northeasterly or a northwesterly direction, the operation of the crank pin will be such as to simultaneously operate all four of the sliding contacts, in two pairs, one pair corresponding to the north and westerly exposures, and the other pair would be operated in a manner to control the heating of the south and easterly exposures. In these cases, the wind motor controlling means would operate all four zoning valves, causing two of them to supply more heat and two of them to supply less heat.

Referring to Fig. 6, a plan view of a building having north, south, east and west exposures is indicated by the letters N, S, E, and W. Diagonal dotted lines indicate four triangular portions which may be considered as four zoning divisions of the building. F represents a source of heat supplied to main G which preferably has a controlling valve A for controlling the total heat to the heating system of the entire four zones, distribution of heat from the valves A being made to the different zones by the branching pipes H, in which are respectively arranged the zoning valves B, C, D and E, these being the valves which are controlled by the four circuit controlling switches 46 and 47.

The total heat supplied through the zoning valves is delivered to the branches and risers I, J, K and L of the respective zones, and may be supplied to radiators M in any of the usual manners. The main valve A may be omitted, if so desired, but is preferably employed, operating under outside thermostatic control, as at T², for controlling the pressure and quantity of the heat supplied to the building to suit varying outside temperature conditions independent of the wind disturbances. This thermostatic control of the main valve A may be accomplished, if desired, by the means set out in my application Serial No. 154,163, filed December 11, 1926. It will be understood that the zoning valves B, C, D and E are adjusted to intermediate position for normal operations, without consideration of wind conditions, and thereafter said valves are operated under control of the wind motor mechanism, irrespective of the temperature changes of the outside atmosphere.

Referring to Figs. 4 and 5, which illustrate a suitable form of zoning valve adapted to be used in connection with the wind motor, the same consists of the following features: D is the valve proper, and is provided with a valve seat O controlled by a valve piece N, the latter operated by a screw threaded valve rod P. The valve rod is held against rotation by a spline P' and is operated to control the valve piece by means of a threaded hub of a worm wheel Q which is rotated by a worm R upon a motor shaft S. The motor shaft S is preferably connected to the armatures of two motors T and T', one rotating clockwise and the other anti-clockwise when energized. Electric current is supplied to the motors by the circuits 48 leading from the switch control means 46 and 47 of the wind motor.

The zoning valve device is provided with a switch board 49 having two series of contacts, those indicated at 50 being adapted to control the operation of the motors in closing the valve, and the others, 60, being adapted to control the operation of the motors in opening the valve device. In connection with these contacts 50 and 60, it is pointed out that they are coupled in pairs by circuits 62, and these pairs of contacts are coupled respectively by circuits 48 with the respective contacts 47 of the wind motor. It will be further noted that there are provided two contact guide rods 64 and 65 connected respectively by circuits 67 and 68 with the motors T and T'. Furthermore, it will be noted that circuits 69 connect the two motors T and T' with the negative source of current. Furthermore, there is provided a sliding carriage 63 movable along the guide rods 64 and 65, and said carriage is provided with two sets of contacts, namely, contacts 51 slidable in connection with the contacts 50, and contacts 61 slidable in connection with contacts 60, the said contacts 51 and 61 being respectively in circuit with the guide rods 64 and 65.

When the valve device above described is fully closed, the contacts 51 of the carriage are all in contact with the stationary contacts 50, whereas the contacts 61 of the carriage are entirely clear of the fixed contacts 60; and reversely, when the valve is fully opened, the contacts 51 are clear of the contacts 50, whereas the contacts 61 are wholly upon the stationary contacts 60. At any intermediate position of the valve piece, the contacts 51 will be partly in circuit with the contacts 50 and the contacts 61 will be partly in circuit with the fixed contacts 60. The carriage 63 is shifted along its guides 64 and 65 by the movable connection 66, as shown in Fig. 5, so that the carriage 63 is moved synchronously with the movement of the valve piece in opening or closing the valve.

It will be noted by reference to Fig. 1, that the right hand contact 46 is resting upon the third stationary contact 47 from the right hand end of the series, and, therefore, current is passing by wire 70 through the connecting rod 45, and thence through contact 46 to the corresponding circuit 48, and is delivered to the second contact 50 of the valve device (Fig. 4) at a time when contact 51 is in circuit with it. This current then passes by contact 51 of carriage 63, thence by guide 64 to circuit 67 and energizes the motor T. This will cause the opening of the valve piece N until the contact 51 leaves the corresponding second contact 50 and reaches the third contact, and the circuit thus being broken, the parts remain at rest in the position shown until the wind motor shifts the contact device 46 to another of the stationary contacts 47. If the movable contact 46, under less velocity of the wind, is moved to the left one block, then the same will operate through the circuit 48, through contact block 60, movable contact 61, guide rod 65, and circuit 68 to energize motor T' to operate the valve piece to partly close the same, or giving to it a reverse operation to what was given by the movement of the contact 46 to the right.

The armatures of the two motors T and T' are upon the same shaft and when one motor is energized to run in one direction, the armature of the other motor is merely rotated with the shaft, and vice versa. By a valve controlling means such as herein set out, the operation of the valve piece is performed by a step by step motion, and it will remain in any position to which it is adjusted until the contacts 46 and 47 of the wind motor impart another actuating motion.

The step by step or selector control of the zoning valve here illustrated in Figs. 1, 4 and 5, is similar to that described and claimed in my application Serial No. 382,547, and filed July 31, 1929, but in that case, the control of the circuits is either by thermostatic control or by manual control, whereas in the present case, wind motor control is employed. It is also to be understood that while a control mechanism of this character is well adapted to controlling of the zoning valves, I do not limit myself to any particular character of mechanism for this purpose, as my invention comprehends broadly the control of zoning valves by a wind motor mechanism, irrespective of the particular means employed for controlling the valve or valves under different velocities and direction of the wind.

As will be noted from Fig. 2, there are four sets of the contacts 46 and 47, all of which are controlled by the same wind motor, but which, on the other hand, each control a different zoning valve, namely, the valves B, C, D and E, of Fig. 6. It will be further understood that while four sets of controlling means for the zoning valves are employed with a single wind motor, the wind motor may be employed to operate one or more of such sets of contacts and associated heat controlling means, and I, therefore, do not limit myself to any particular number of these devices for each wind motor.

It will also be understood that instead of employing two motors with capacities to rotate in opposite directions, a single reversible motor may be employed, the contacts 50 and 60 controlling the circuits of the motor to cause it to rotate in one direction or the other, as will be readily understood by those skilled in the art.

As shown, I have indicated four different adjustments by reason of the employment of four fly ball governors, each of which would have capacity for moving the contact 46 from one of the stationary contacts to the next, and it would, therefore, require four contacts for adjustment above or below the normal adjustment of the valve for supplying what may be designated as 100% of heat requirements. Assuming the mid-contact 47 insures 100% of heat to be supplied by the zoning valve, a movement of contact 46 to the next stationary contact 47 by action of the governor 17 may cause 110% of heat to be supplied by the valve; the next movement of the contact 46 under the action of governor 18 may provide 120% of heat, and so on, under the action of the governors 19 and 20, the heat supply may be increased to 130% and 140%, respectively. Reversely, the closing steps from the normal heat supply would reduce the heat 10% for each step in closing the valve. It will be understood, however, that in referring to these percentages of heat or steam, they are given simply by way of illustration and not as limitations.

While I have conveniently described the wind motor controlling means in respect to regulating the amount of heat supplied to different zoned parts of the structure to be heated, I do not restrict myself to the use of any particular source of heat, as my invention is equally applicable to the use of steam, hot water, or hot air, or other suitable medium in the heating system, and, therefore, reference to heat and heating fluids are intended to include the use of steam, hot water, or heating by any other fluid or gaseous medium.

The particular features of the wind motor herein illustrated and described are not to be considered as limitations of the invention taken in a more generic sense, as any form of a wind motor capable of response to velocity of the wind or to the direction of the wind, or to both, at the same time, and when associated with means for controlling the supply of heating fluid or medium to the heating system, are within the scope and meaning of my invention. Well known types of wind motors, responsive to velocity and direction, are those, for example, which employ a universally supported upright shaft carrying at its top or bottom a ball or equivalent structure which may be blown more or less to any angular position and inclining in any direction about a vertical axis; also the construction in which there is a vertical shaft universally supported to swing in all directions and having at the top a cone-shaped device or receptacle into which the air is blown; and still another form having a vertical shaft rotatable by cups secured to its upper portion and combined with a direction controlling vane, all of which are intended to respond to velocity and direction of the wind; and it is thought unnecessary to illustrate these various types of wind motors in view of them being well known in the art.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details as the same are susceptible of modification in various particulars, without departing from the spirit or scope of the invention.

Having now described my invention, what I claim and desire to secure by Letters Patent, is:

1. In a system for heating buildings, radiators arranged in groups within the buildings, means for supplying a heating fluid to said groups of radiators and respectively providing heating means for different zones within the building, separate zoning valve devices for controlling the supply of heating fluid to the heating means of the different zones, a wind motor having a movable part actuated by the direction and velocity of the wind adjacent to the building, and means under control of the movable part of the wind motor for controlling the valves inversely, whereby one of the zoning valves is operated to increase the supply of the heating fluid and another of the zoning valves is operated to decrease the supply of heating fluid for simultaneously increasing the heat in one zone portion of the building while decreasing the heat in another zone portion of the building.

2. The invention according to claim 1, wherein the zoned portions of the building and the heating means therein are arranged at different points of the compass.

3. The invention according to claim 1, wherein the wind motor and means controlled thereby cause the zoning valve of the zoned portion of the building upon which the wind is directed to supply an increased pressure and volume of the heating fluid.

4. The invention according to claim 1, wherein the movable part of the wind motor is also movable under change in the direction of the wind to control a plurality of zoning valves for zones to be heated which zones are positioned in the building in angular relation.

5. The invention according to claim 1, including means operable under the direction of the wind for imparting to the movable part of the wind motor a movement at an angle to its first mentioned movement.

6. The invention according to claim 1, wherein the zoning valves are electrically operated, and the means under control of the movable part of the wind motor comprises electric circuits from each of the electrically operated zoning valves, and switch controlling means between the movable part of the wind motor and the valve operating mechanisms whereby a step by step motion is imparted to the zoning valves in opening and closing.

7. The invention according to claim 1, wherein the building is divided into four zones whose outer walls provide substantially north, south, east and west exposures, and means on the wind motor whereby the movable part is given a rectilinear reciprocation under changes in velocity of the wind and is given a rotary movement under changes of direction of the wind, and wherein also, the means under control of the movable part of the wind motor are operable from four positions of the wind motor, substantially at right angles to the walls of the zone and approximately 90° apart for causing the zoning valves to be operated in pairs.

8. In a heating apparatus, the combination of a building, a source of heating medium, radiators arranged in a plurality of groups, pipes extending from the source of heating medium to the respective groups of radiators, valve devices in the pipes to the respective groups for controlling the supply of heating medium to the respective groups, and means under control of movements of air exterior to the building for automatically adjusting the valves to supply more or less heating medium to the respective groups of radiators, whereby the inside temperature of the building in the vicinity of the radiators may be maintained substantially uniform notwithstanding atmospheric changes exterior to the building.

9. The invention according to claim 8, wherein thermostatically controlled means is provided for regulating the total heat which is delivered to the piping and valves supplying the plurality of groups of radiators, and the means under control of the movements of air exterior to the building include a wind motor affected by the velocity and direction of the wind.

10. In combination, a building, means for heating the building, a wind motor responsive to changes in velocity of the wind and also changes in the direction of the wind, and means under the control of the wind motor for regulating the supply of heating medium to the means for heating the building, whereby more of the heating medium is automatically supplied to that portion of the means for heating the building which are adjacent to the walls thereof subjected to winds.

11. The invention according to claim 10, wherein the wind motor comprises a propeller affected by the velocity of the wind and a shaft rotated by the propeller, combined with means supporting the propeller and affected by the direction of the wind to cause the propeller at all times to face the wind, and means controlled both by the speed of the propeller driven shaft and the means for adjusting the wind motor for direction of the wind for jointly regulating the supply of the heating fluid to the heating means of the building.

12. A building, means adjacent to the exposed walls for heating the building, a source of heating medium, a plurality of branch mains and zoning valves arranged at intervals about the building for supplying the heating medium to the heating means, combined with a wind motor responsive to velocity and direction of the wind, and means controlled by the wind motor for selectively varying the quantity of heating medium commensurate with the velocity of the wind and the adjustment of the zoning valve to supply a greater quantity of the heating medium in accordance with the direction of the wind, whereby those portions of the heating means adjacent to the walls of the building which receive the influence of the wind are heated to a greater extent than other portions, whereby a substantially uniform temperature may be maintained within the building.

13. The invention according to claim 12, wherein means are provided for controlling the heating medium flowing from the source to the zoning valves and heating means, and thermostatically controlled means for controlling the first mentioned means in accordance with changes in temperature of the atmosphere outside of the building.

14. The invention according to claim 1, wherein the wind motor has a rotating shaft driven by a propeller, and combined with a plurality of centrifugal governors, means for driving the several centrifugal governors at different speeds from the rotating shaft, and means movable with a step by step movement under the control of the centrifugal governors operating in succession.

15. The invention according to claim 10, wherein the means under the control of the wind motor for regulating the means for supplying heating medium to the building comprises a valve mechanism, means operated by the wind motor whereby the changes in the speed of the wind motor are caused to impart corresponding opening and closing movements to the valve mechanism and in which an increase in the centrifugal action of the wind motor produces an increased opening of the valve mechanism and a decrease in centrifugal action of the wind motor produces a decreased opening of the valve mechanism.

16. The invention according to claim 10, wherein the means for heating the building are arranged within it and in different zones spaced adjacent to the different walls thereof and the means for controlling the supply of heating medium to the heating means comprises a plurality of independently operated zoning valves respectively associated with the heating means for said zones, and means between the wind motor and the plurality of zoning valves whereby the wind motor causes the several zoning valves to be operated for controlling the supply of the heating medium in accordance with the movement of the wind motor under changing directions of the wind.

17. The invention according to claim 10, wherein thermostatically controlled means are included and control the initial supply of the heating medium delivered to the building and prior to its reaching the heating means.

18. A building, means for heating the building, and regulating means for controlling the supply of heating medium to the means for heating the building, a wind motor responsive to changes in velocity of the wind, and means under the control of the wind motor for controlling the regulating means, whereby the supply of heating medium is varied commensurately with changes in the wind velocity.

19. The invention according to claim 18, wherein the wind motor is also responsive to changes in the direction of the wind, and means under the control of the wind motor are provided and control the regulating means whereby it operates under the control of the wind motor to increase the supply of heating medium to different main portions of the building upon which the wind impinges as it changes its direction.

20. The invention according to claim 18, wherein the means under the control of the wind motor includes a plurality of devices responsive to centrifugal action and operating in succession, and a movable member common to all of said centrifugal devices and moved to different extents by the successive actions of the centrifugal devices and constituting a portion of the regulating means.

21. The invention according to claim 18, wherein the means under the control of the wind motor includes a plurality of devices responsive to centrifugal action and operating in succession and a movable member common to all of said centrifugal devices and moved to different extents by the successive actions of the centrifugal devices and constituting a portion of the regulating means, and the manually adjustable means to vary the time and extent upon action of the said centrifugal devices.

22. Steam heating apparatus including a plurality of groups of heat radiating elements, a steam main for supplying steam to each of said groups, and wind-controlled mechanism associated with said mains to vary the pressure in certain of said mains upon change in the direction of the wind.

23. Steam heating apparatus including a plurality of groups of heat radiating elements, a steam main for supplying steam to each of said groups, and wind-controlled mechanism associated with said mains to vary the pressure in certain of said mains upon change in the direction and velocity of the wind.

24. Steam heating apparatus including a plurality of groups of heat radiating elements, a steam main for supplying steam to each of said groups, and wind-controlled mechanism which increases the pressure in certain of said mains in response to an increase in wind velocity when said velocity is maintained for a predetermined length of time, said mechanism also selecting the mains whose pressure is to be increased according to the direction of the wind.

25. Steam heating apparatus including heat radiating elements, a steam main for supplying steam thereto, and wind responsive mechanism for automatically varying the steam pressure in said main in response to changes in wind velocity.

26. A steam heating apparatus including a source of steam supply, a pressure regulating valve, a plurality of heat radiating elements, a header conducting steam from said supply source to said valve, a steam pipe conducting steam from said valve to said heat radiating elements, and wind-responsive means for controlling said regulating valve to vary the pressure in said steam pipe in response to variations in wind velocity.

JOHN A. SERRELL.